(12) United States Patent
Honzek

(10) Patent No.: US 7,866,736 B2
(45) Date of Patent: Jan. 11, 2011

(54) UTILITY VEHICLE WITH HINGED COVER ELEMENT

(75) Inventor: Robert Honzek, Oberthingau (DE)

(73) Assignee: AGCO GmbH, Marktoberdorf (DE)

( * ) Notice: Subject to any disclaimer, the term of this patent is extended or adjusted under 35 U.S.C. 154(b) by 77 days.

(21) Appl. No.: 12/252,945

(22) Filed: Oct. 16, 2008

(65) Prior Publication Data

US 2009/0102242 A1    Apr. 23, 2009

(30) Foreign Application Priority Data

Oct. 17, 2007    (DE) .................... 10 2007 049 768

(51) Int. Cl.
 *B60N 3/02* (2006.01)
 *B60R 3/00* (2006.01)
 *B62D 25/00* (2006.01)
(52) U.S. Cl. ............... 296/190.08; 296/198; 296/1.02; 296/151; 280/164.1
(58) Field of Classification Search ............ 296/190.01, 296/190.04–190.06, 190.08, 190.11, 198, 296/37.5, 1.02, 1.04, 146.1, 151; 280/163, 280/164.1; 180/89.13, 89.16
 See application file for complete search history.

(56) References Cited

U.S. PATENT DOCUMENTS

| 2,220,035 | A | * | 10/1940 | Brack | 105/430 |
| 3,378,278 | A | * | 4/1968 | Froitzheim et al. | 280/163 |
| 4,216,725 | A | * | 8/1980 | Hallam | 105/348 |
| 6,178,364 | B1 | * | 1/2001 | Delurey et al. | 701/36 |
| 7,222,884 | B2 | * | 5/2007 | Callan et al. | 280/848 |
| 7,516,997 | B2 | * | 4/2009 | Kuznarik et al. | 296/62 |
| 7,637,519 | B2 | * | 12/2009 | Leitner et al. | 280/166 |
| 2002/0003340 | A1 | * | 1/2002 | Hallquist | 280/163 |
| 2005/0006921 | A1 | * | 1/2005 | Chumley et al. | 296/75 |
| 2009/0038885 | A1 | * | 2/2009 | Ellement | 182/97 |
| 2009/0145692 | A1 | * | 6/2009 | Flickinger et al. | 182/127 |

* cited by examiner

*Primary Examiner*—Jason S Morrow
(74) *Attorney, Agent, or Firm*—Hovey Williams LLP

(57) ABSTRACT

The invention relates to a utility vehicle (1) with a hinged cover element (12) which covers a fuel tank (15) and at least part (24) of an ascent region when the cover element is in a covering position. The cover element (12) can be pivoted from the covering position to an open position. A safeguarding element (11) is non-rotatably coupled to the cover element (12), so that the cover element (12) and the safeguarding element (11) have the same pivot axis and are both moved to the open position simultaneously.

16 Claims, 5 Drawing Sheets

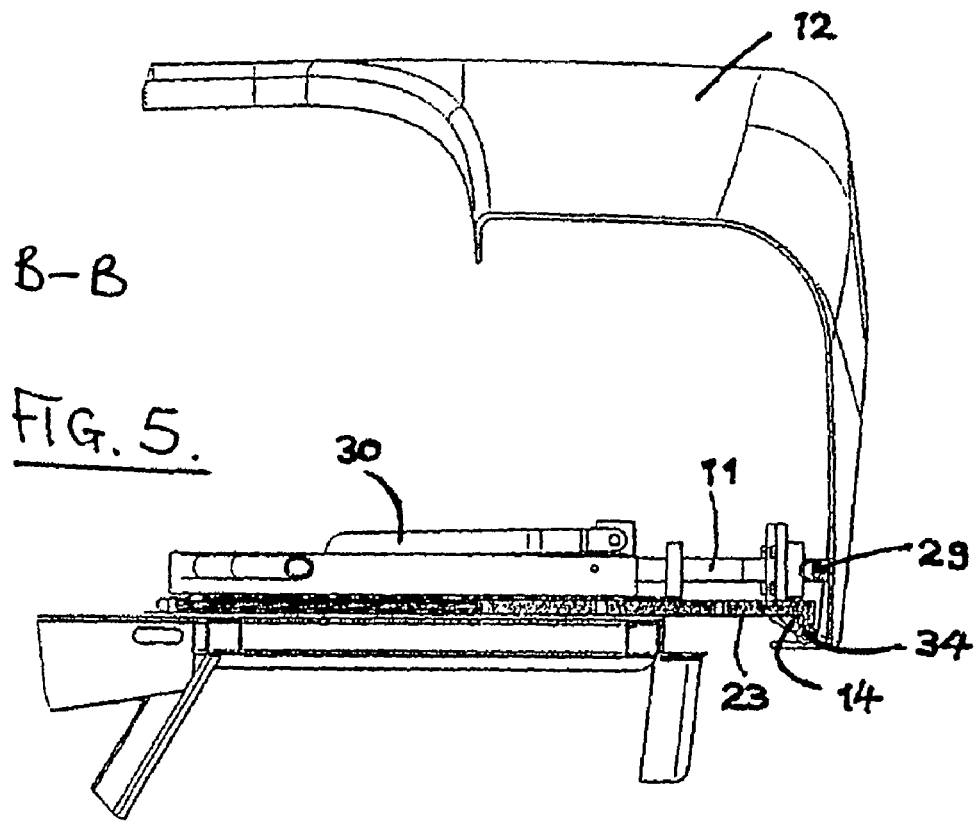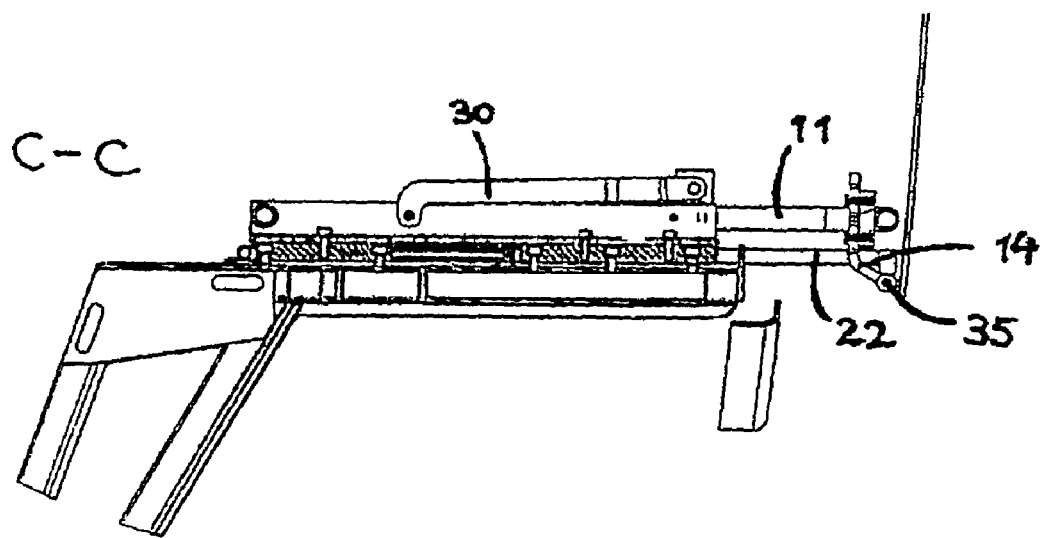

Figure 1:
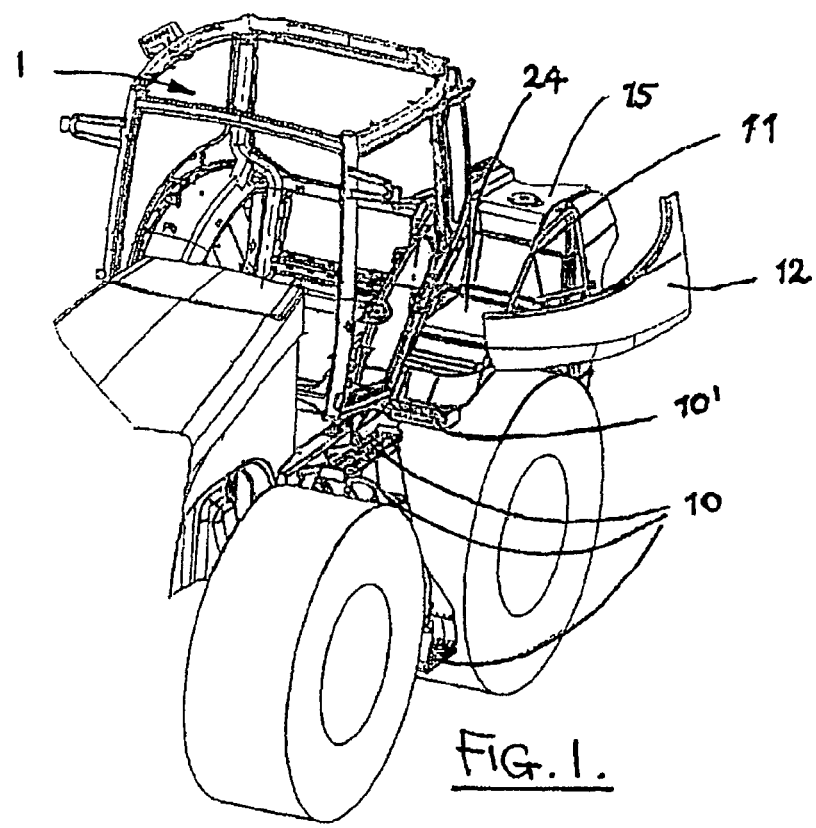

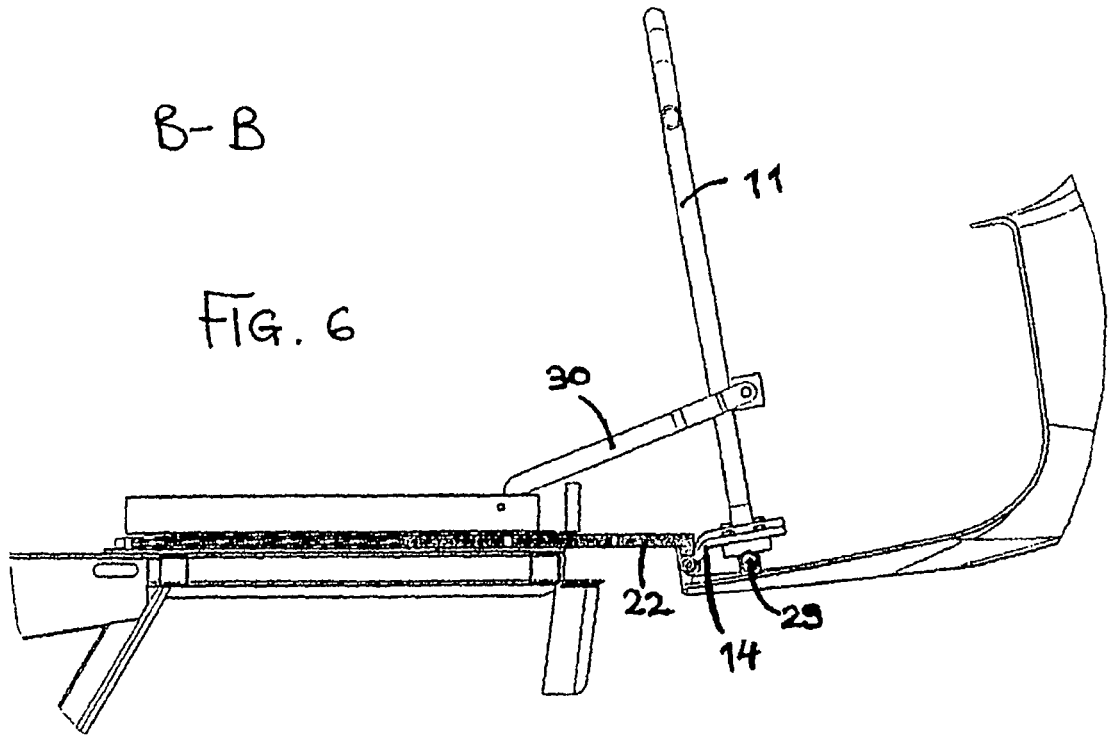
FIG. 6
B-B
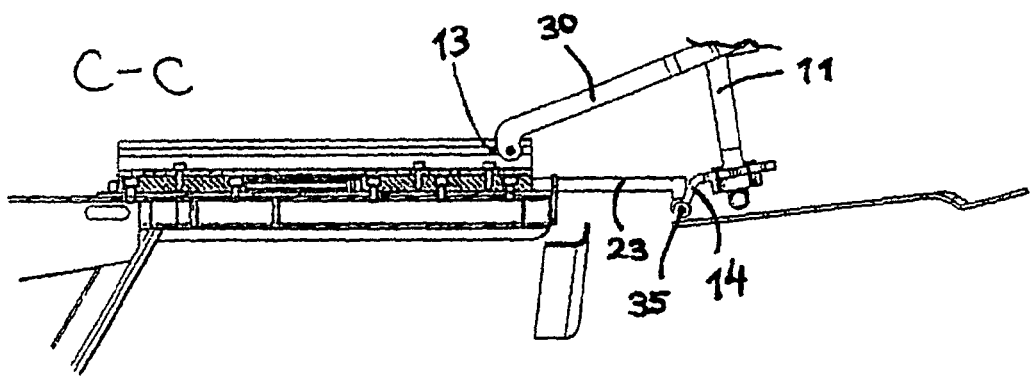
C-C

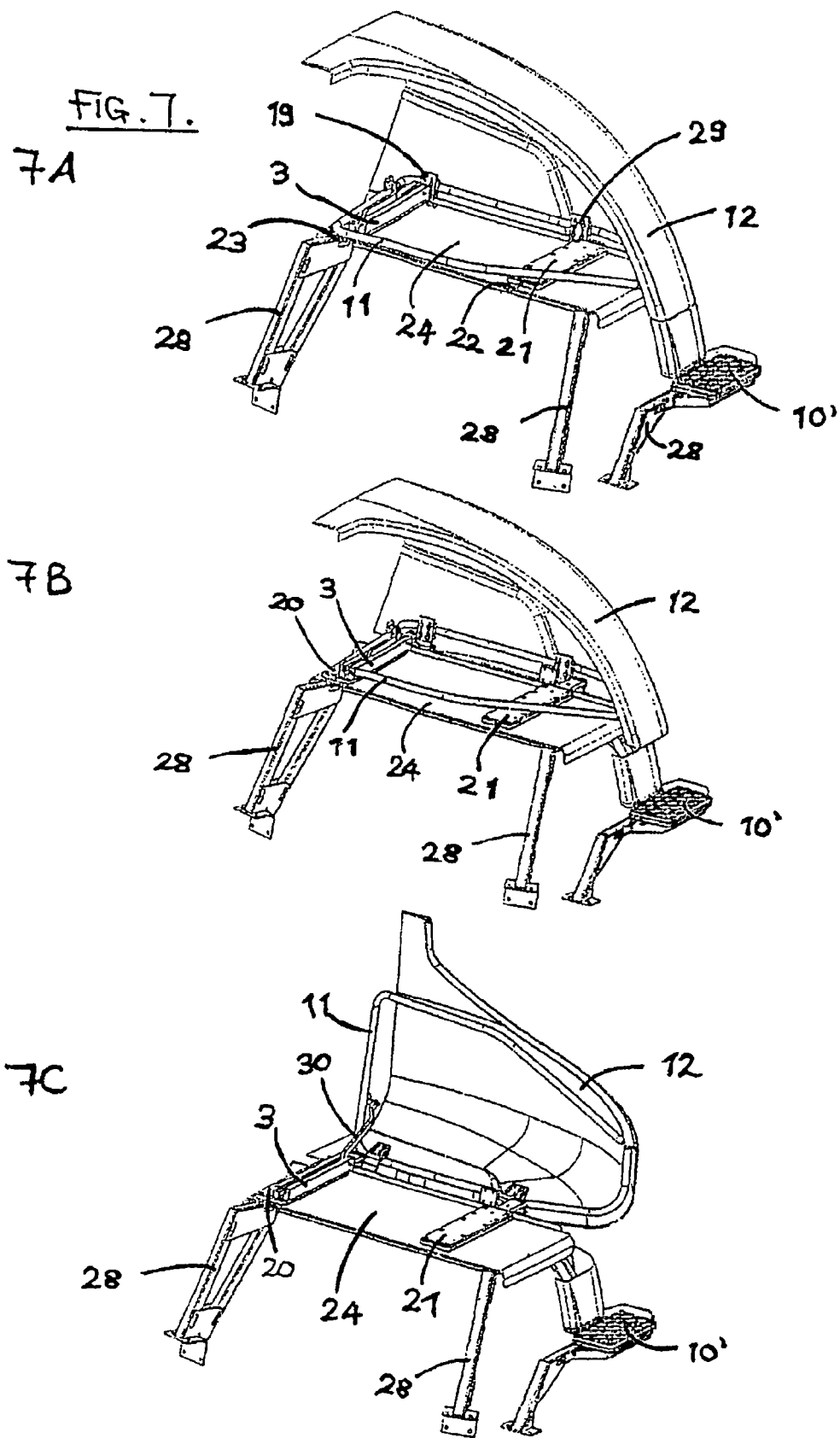

UTILITY VEHICLE WITH HINGED COVER ELEMENT

CROSS REFERENCE TO RELATED APPLICATION

The present application claims the benefit of and priority from German Patent Application No. DE 102007049768.9, filed Oct. 17, 2007, the entire disclosure of which is hereby incorporated by reference herein.

BACKGROUND OF THE INVENTION

The invention relates to a utility vehicle with hinged cover element.

In contrast to a car, in many utility vehicles a driver's cab can only be accessed by ascent devices. These ascent devices can have a ladder-like form and are constructed, for example in wheel-driven tractors, transversely to the direction of travel of the utility vehicle. The ascent devices are also usually located centrally between front and rear tires of the utility vehicle. However there are also utility vehicles, such as track-type tractors, construction machines or harvesting machines, in which a central arrangement of the cab is not possible as the respective utility vehicle does not have sufficient space for it. In utility vehicles of this kind the ascent device is divided into two regions, a vertical ascent region and an ascent region running parallel to the direction of travel of the utility vehicle, the two ascent regions being connected together. In utility vehicles of this kind it is therefore possible to enter the cab, for example following an ascent using the vertical ascent region, only via the ascent region running parallel to the direction of travel of the utility vehicle.

Using the vertical ascent region and the ascent region running parallel to the direction of travel of the utility vehicle, other regions of the vehicle are also accessible in which, for example, maintenance or repair work is to be carried out and which would otherwise be difficult to access. A fuel tank can also be arranged on the utility vehicle in such a way that refuelling of the utility vehicle is only possible via the ascent region running parallel to the direction of travel of the utility vehicle. Since the ascent region running parallel to the direction of travel of the vehicle is located at a height of approximately 1.5 m however, a safeguarding element has to be provided on this ascent region to prevent accidents.

The safeguarding element should include a handle to reduce the risk of accidents resulting from a fall from the ascent region running parallel to the direction of travel of the utility vehicle. This safeguarding element can be constructed for example as a bent tube and is usually permanently connected to the utility vehicle, and at relatively high vehicle speeds this causes a relatively high coefficient of drag of the utility vehicle owing to, for example, protruding edges of the safeguarding element. The risk of injury is also increased as a result of the protruding edges of the safeguarding element, for example for motor cyclists who can be flung against these relatively large edges in the event of a collision with the utility vehicle.

The object underlying the present invention accordingly lies in providing a safeguarding element which improves the aerodynamic properties of the utility vehicle and simultaneously reduces the risk of injury in the event of a collision.

BRIEF SUMMARY OF THE INVENTION

This object is achieved according to the invention by providing a utility vehicle with a hinged cover element for pivoting between a first covering position and a second open position, comprising a safeguarding element coupled at a fixed angular relationship with respect to the cover element, wherein the cover element and the safeguarding element have a common pivot axis in order to be able to pivot from the first position into the second position and vice versa.

The hinged cover element and the safeguarding element may also be mounted for linear movement relative to the utility vehicle on guide means.

This guide means may comprise first and/or second guide units, each guide unit comprising a U-shaped first and second housing within which a respective first and second guide element is slideable to allow said linear movement.

The covering element when in the covering position may cover at least part of an ascent region of the vehicle which extends generally parallel to the direction of travel of the vehicle.

The cover element may also cover a fuel tank which accessed via said least part of the ascent region when the cover element is in its open position.

Other advantageous features of the invention are identified in the sub-claims of the application.

The advantages achieved with the invention consist in particular in that in a covering position of the cover element, the safeguarding element is arranged in such a way as to achieve minimal projection from the cover element. The risk of injury in the event of collisions with for example motor cyclists is reduced owing to covering of the safeguarding element and an associated avoidance of protruding edges of the safeguarding element.

At relatively high vehicle speeds the coefficient of drag is also lower as the projection of the cover element, and therewith its surface, is smaller. Owing to coupling of the safeguarding element to the cover element access to the ascent region running parallel to the direction of travel of the utility vehicle is blocked by the safeguarding element when the cover element is not completely opened, and thus reduces the risk of accidents. A further advantage lies in the fact that when the cover element is in an open position, the safeguarding element is arranged in such a way that there is a handle to avoid falling from the ascent region running parallel to the direction of travel of the utility vehicle. The cover element also provides protection against soiling due to dust and dirt and against UV radiation. The components on the inside of the cover can consequently be manufactured from inexpensive plastics materials or paints with low UV resistance for example.

A further advantageous development of the invention lies in a latching element ensuring that the cover element cannot unintentionally return from an open position into the covering position again.

An advantageous development of the invention also lies in the possibility of being able to protect regions of the utility vehicle from unauthorised access by means of a locking mechanism which can be arranged on the cover element for example.

An advantageous development of the invention also lies in a respective spring element being arranged in each guide unit. This spring element, which is pre-tensioned in the covering position of the cover element, facilitates opening of the cover element by producing a force component in the opening direction of the cover element.

BRIEF DETAILS OF THE DRAWINGS

Figure 2:
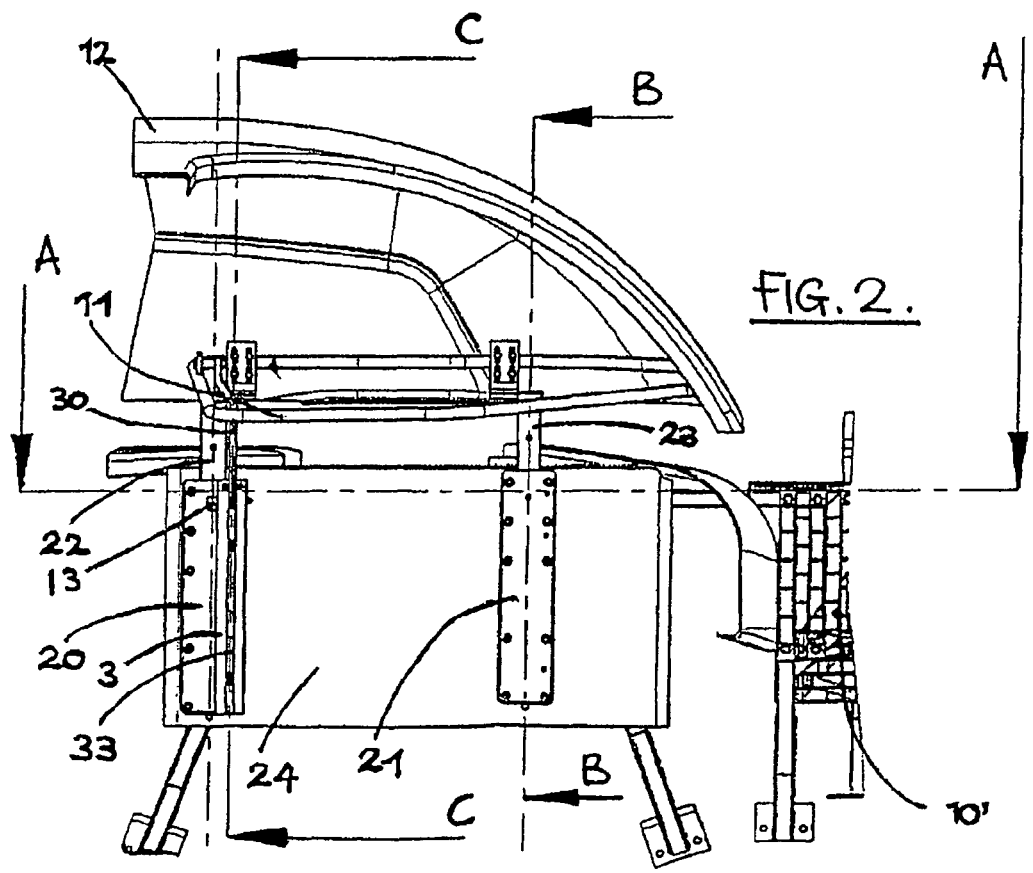
Figure 3:
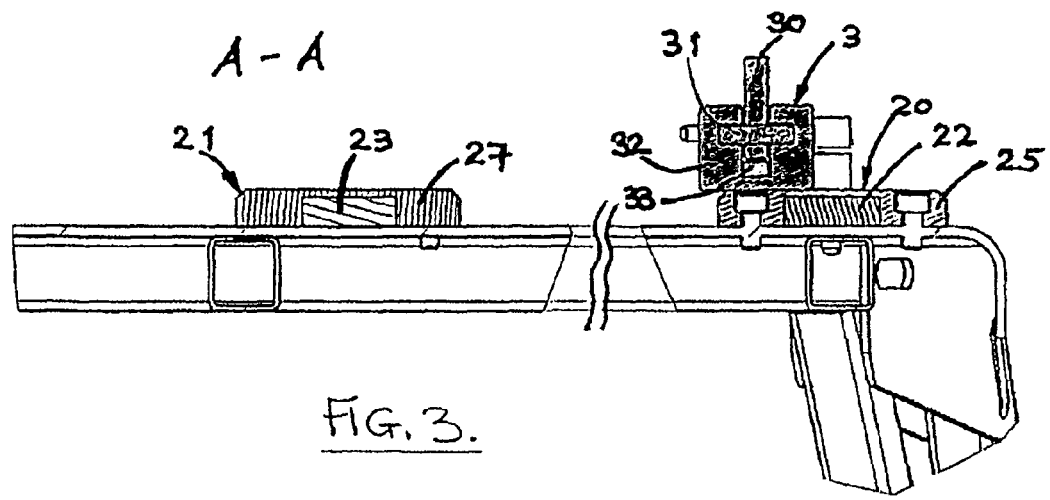
Figure 4:
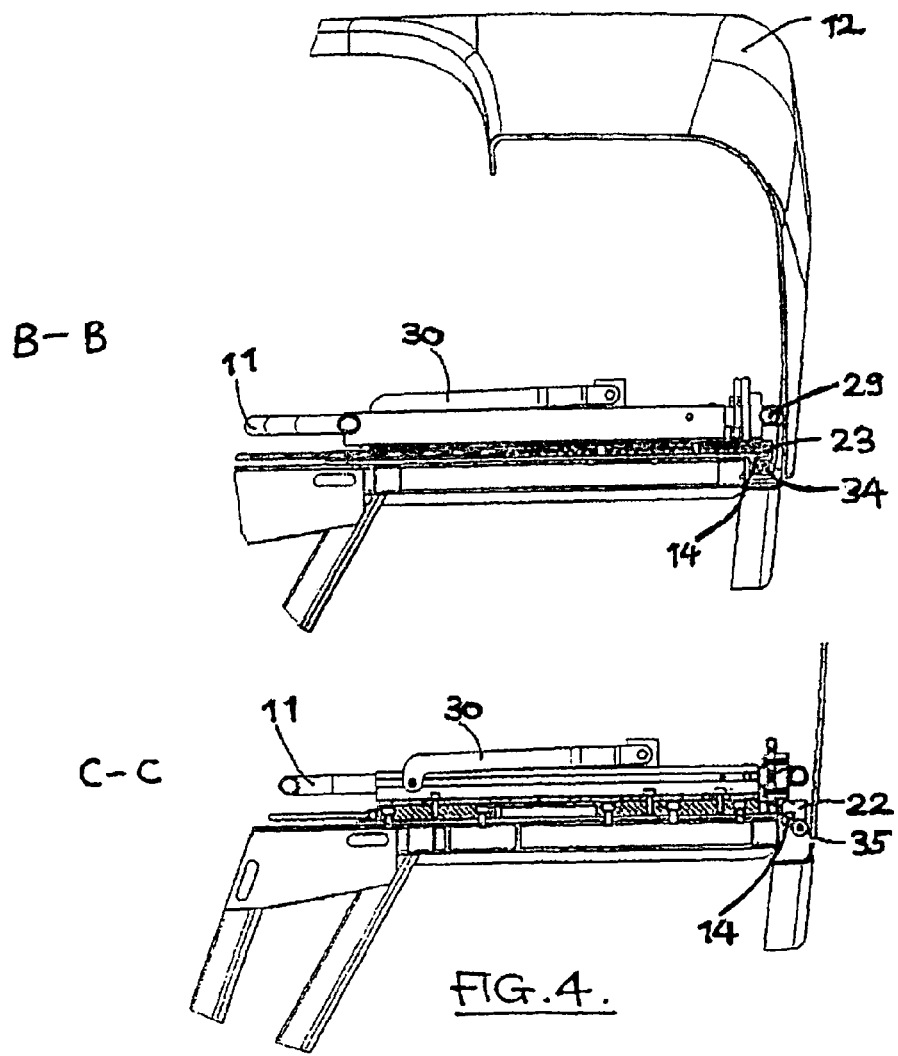

Details of the invention will be described in more detail with reference to the drawings, in which:

FIG. 1 shows a perspective view of a utility vehicle,

FIG. 2 shows a plan view in an open position of the cover element of an ascent region, running parallel to the direction of travel of the utility vehicle, with a step element, FIG. 3 shows a sectional view through first and second guide units, FIG. 4 shows a sectional view in a covering position of the cover element through a first guide unit and through a guide part arranged on the second guide unit, FIG. 5 shows a sectional view in a position of the cover element displaced transversely to the direction of travel through a first guide unit and through a guide part arranged on the second guide unit, FIG. 6 shows a sectional view in an open position of the cover element through a first guide unit and through a guide part arranged on the second guide unit, and FIG. 7 shows a perspective view of the cover element and the safeguarding element for a covering position, a position displaced transversely to the direction of travel and an open position of the cover element.

DETAILED DESCRIPTION OF PREFERRED EMBODIMENT

FIG. 1 shows a perspective view of a utility vehicle. A utility vehicle 1 comprises a vertical ascent region which is composed of vertical ascent elements (steps) 10. The utility vehicle 1 also comprises an ascent region running parallel to the direction of travel of the utility vehicle, and which is composed for example of an ascent element 10' and a step element 24. The vertical ascent elements 10 are arranged on the utility vehicle perpendicular to the direction of travel thereof. Designs are also possible in which the ascent region running parallel to the direction of travel of the vehicle does not have an ascent element 10' and the step element 24 can be accessed directly from the vertical ascent element 10 without a ascent element 10' connected in between.

The utility vehicle 1 also comprises a cover element 12 and a safeguarding element 11, the cover element 12 being shown in an open position in FIG. 1. In this case the risk of injury, for example during refuelling of a fuel tank 15, is reduced in this respect as a handle is provided by means of the safeguarding element 11. The fuel tank 15 can accordingly be refuelled for example as the step element 24 is accessed via the vertical ascent elements 10 and via the ascent element 10'. The fuel tank 15 is easily accessible from the step element 24 for refuelling.

FIG. 2 shows a plan view in an open position of the cover element of an ascent region, running parallel to the direction of travel of the utility vehicle, with a step element 24. A first guide unit 21 and a second guide unit 20 are arranged on the step element 24. Both the first guide unit 21 and the second guide unit 20 can, for example, be linear guides. The first guide unit 21 is coupled by a first guide element 23 and the second guide unit 20 by a second guide element 22 to the cover element 12.

The first and/or second guide element(s) 23, 22 and the cover element 12 can be coupled for example by a pivot bearing described below. The second guide unit 20 also has a guide part 3. The guide part 3 has a guide groove 33 by means of which a lever element 30 can be guided. The lever element 30 is coupled at one end to the guide part 3 and at the opposing end to the cover element 12.

FIG. 3 shows a sectional view A-A from FIG. 2 through first and second guide units. The sectional view A-A shows that the first guide unit 21 is composed of a first U-shaped housing 27 and the first guide element 23. The second guide unit 20 is composed moreover of a second U-shaped housing 25 and the second guide element 22. The guide part 3 is also arranged on the second guide unit 20 and has a U-shaped guide part housing 32 with the guide groove 33 arranged inside the U-shaped guide part housing 32.

The end of the lever element 30 facing the guide groove 33 has a pin 31 that is arranged in the guide groove 33 in such a way that displacement and fixing of the lever element 30 are possible in the guide groove 33. Since the lever element 30 is coupled to the cover element 12 at its end opposing the guide groove 33, the position of the lever element 30 on the guide part 3 depends on the position of the cover element 12.

FIG. 4 shows sectional views B-B and C-C from FIG. 2 in a covering position of the cover element through a first guide unit and through a guide part arranged on the second guide unit. The view B-B is the sectional view through the first guide unit 21 and the view C-C is the sectional view through the guide part 3 arranged on the second guide unit 20. The safeguarding element 11 is non-rotatably connected to the cover element 12 by a first connecting element 29 and by a second connecting element 19 (cf. FIG. 7) that is not visible in FIG. 4. A fixed angle is established between the safeguarding element 11 and the cover element 12 by this non-rotatable connection. The first guide element 23 is also coupled to a first pivot bearing 34.

The second guide element 22 of the second guide unit 20 is coupled at one end to the cover element 12 by a second pivot bearing 35. The safeguarding element 11 is also coupled by a third connecting element 14, arranged at one end of the safeguarding element 11, to the second pivot bearing 35. Both the safeguarding element 11 and the cover element 12 are thereby arranged about a pivot axis fixed by the first pivot bearing 34 and the second pivot 35 bearing in a hinged manner.

FIG. 5 shows a sectional view in a position of the cover element displaced transversely to the direction of travel through a first guide unit and through a guide part arranged on the second guide unit 20. Before it is pivoted down and is thus brought into the open position, the cover element 12 is displaced by a certain length transversely to the direction of travel of the utility vehicle. This displacement of the cover element 12 is necessary in this embodiment as pivoting-down of the cover element 12 is not possible owing to other components arranged on the utility vehicle since the cover element 12 would abut against these components when pivoted-down into the open position. Designs are possible moreover in which pivoting-down of the cover element 12 is possible without this prior displacement of the cover element 12 directed transversely to the direction of travel of the utility vehicle.

When the cover element 12 is displaced transversely to the direction of travel of the utility vehicle, the safeguarding element 11, the first guide element 23 and the second guide element 22 are displaced in the same direction as the cover element 12. The first guide element 23, second guide element 22 and safeguarding element 11 are displaced transversely to the direction of travel of the utility vehicle since they are each coupled to the respective pivot bearing 34, 35 and the pivot bearing 34, 35 transmits the force components to the first guide element 22, the second guide element 23 and the safeguarding element 11 transversely to the direction of travel of the utility vehicle. Moreover the force component of the displacement directed transversely to the direction of travel of the utility vehicle is also transmitted to the safeguarding element 11 by a first connecting element 29 and a second connecting element 19, not visible in FIG. 6.

The length of displacement of the cover element 12 directed transversely to the direction of travel of the utility vehicle is limited by stops (not shown in FIG. 5) of the first guide element 23 and/or the second guide element 22. Above a certain length of displacement of the cover element 12 directed transversely to the direction of travel of the utility vehicle the respective stops of the first and/or second guide element(s) 23, 22 abut against the first U-shaped housing of the first guide unit and/or the second U-shaped housing of the second guide unit and thereby limit the length of displacement of the cover element 12.

FIG. 6 shows a sectional view in the open position of the cover element 12 through the first guide unit and through the guide part arranged on the second guide unit. When the displaced cover element shown in FIG. 5 is pivoted down into the open position, the safeguarding element 11 has to move in the same direction as the cover element 12 owing to the non-rotatable connection in the connecting element 29 between the cover element 12 and the safeguarding element 11. The safeguarding element 11 is rotated in this case by the pivot axis defined by the first and second pivot bearings 34, 35.

Moreover, when the safeguarding element 11 is rotated the lever arm 30 is displaced in the same direction as the safeguarding element 11 until the lever arm 30 abuts against the U-shaped guide part housing of the guide part 3. Due to coupling of the lever arm 30 to the safeguarding element 11 the lever arm 30 also experiences an upwards movement when the safeguarding element 11 is rotated. This positioning of the lever arm 30 can be ensured by means of a latching element 13, so a return displacement of the lever arm 30, and therewith the safeguarding element 11, into the original covering position of the cover element can be prevented.

FIG. 7 shows a perspective view of the cover element and safeguarding element for a covering position, a position displaced transversely to the direction of travel and an open position of the cover element. The step element 24 and the ascent element 10' are each arranged on fastening means 28. The fastening means 28 are also coupled to a vehicle frame, not shown in FIG. 7.

The view 7A shows the cover element 12 in its covering position. The first guide element 22 protruding from the first guide unit 21 and the second guide element 23 protruding from the second guide unit 20 respectively are also shown in view 7A. The safeguarding element 11 is non-rotatably connected to the cover element 12 by means of the first connecting element 29 and the second connecting element 19.

The view 7B shows the case where immediate pivoting-down of the cover element 12 from the covering position is not possible owing to construction-related factors in the utility vehicle, and therefore the cover element 12 is displaced into an additional position, transverse to the direction of travel of the utility vehicle.

The view 7C shows the cover element 12 in its open position. The cover element 12 is fixed in its open position by means of the lever element 30 and the latching element 13 (cf. FIG. 2), such as a locking pin for example.

The invention relates to a utility vehicle with hinged cover element. A cover element can be pivoted into a first covering position and a second open position. A safeguarding element is non-rotatably coupled to the cover element, the cover element and the safeguarding element having the same pivot axis.

The invention claimed is:

1. A utility vehicle comprising:
   ascent structure configured and arranged to permit an operator to ascend the vehicle;
   a cover assembly including a cover element and a handle element fixed to the cover element,
   said cover assembly being selectively placeable in either a covering position in which the cover element is spaced above and at least partially covers the ascent structure or an open position in which the cover element uncovers the ascent structure for use by the operator; and
   guide unit mechanism including a stationary part, a shiftable part carried by said stationary part, and a hinge pivotally attaching the cover assembly to said shiftable part to permit the cover assembly to be selectively pivoted about a pivot axis associated with said hinge between said covering and open positions,
   said shiftable part being selectively shiftable relative to said stationary part between retracted and extended positions for permitting the cover assembly to be shifted away from the ascent structure before the cover assembly is pivoted to said open position,
   said guide unit mechanism further including a retaining element connected between the stationary part and the cover assembly for preventing the cover assembly from pivoting beyond said open position,
   said handle element being fixed to the cover element in such a manner that when the cover assembly is in said covering position the handle element is disposed beneath the cover element in overlying relationship to the ascent structure and when the cover assembly is in said open position the handle element projects upwardly alongside the ascent structure for grasping by the operator during use of the ascent structure.

2. A utility vehicle as claimed in claim 1,
   said guide unit mechanism including a pair of said stationary parts that are spaced apart in an axial direction with respect to said pivot axis, a pair of said shiftable parts for respective ones of the stationary parts, and a pair of hinges for respective ones of the shiftable parts.

3. A utility vehicle as claimed in claim 2,
   each of said stationary parts comprising a generally transversely U-shaped housing,
   each of said shiftable parts being slideable within a respective one of said housings for carrying out said shifting of the shiftable part between said retracted and extended positions.

4. A utility vehicle as claimed in claim 3,
   each of said shiftable parts having a limit stop engageable with abutment structure on the corresponding housing for preventing the shiftable part from shifting beyond said extended position.

5. A utility vehicle as claimed in claim 4,
   one of said housings being provided with a guide groove,
   said retaining element comprising a lever having one end received within said groove and an opposite end coupled with said cover assembly,
   said lever being provided with a transverse pin at said one end of the lever for keeping said one end of the lever received within said groove.

6. A utility vehicle as claimed in claim 1,
   said stationary part comprising a generally transversely U-shaped housing,
   said shiftable part being slideable within said housing for carrying out said shifting of the shiftable part between said retracted and extended positions.

7. A utility vehicle as claimed in claim 6,
said shiftable part having a limit stop engageable with abutment structure on said housing for preventing the shiftable part from shifting beyond said extended position.

8. A utility vehicle as claimed in claim 7,
said housing being provided with a guide groove,
said retaining element comprising a lever having one end received within said groove and an opposite end coupled with said cover assembly,
said lever being provided with a transverse pin at said one end of the lever for keeping said one end of the lever received within said groove.

9. A utility vehicle as claimed in claim 1,
said shiftable part having a limit stop engageable with abutment structure on said stationary part for preventing the shiftable part from shifting beyond said extended position.

10. A utility vehicle as claimed in claim 1,
said stationary part being provided with a guide groove,
said retaining element comprising a lever having one end received within said groove and an opposite end coupled with said cover assembly,
said lever being provided with a transverse pin at said one end of the lever for keeping said one end of the lever received within said groove.

11. A utility vehicle as claimed in claim 1,
said retaining element being connected between said stationary part and said cover element.

12. A utility vehicle as claimed in claim 1,
said guide unit mechanism further comprising a latch operable to releasably hold said cover assembly in said open position against unintentional return to said covering position.

13. A utility vehicle as claimed in claim 1,
said guide unit mechanism further including a spring operable to assist in shifting said shiftable part to said extended position.

14. A utility vehicle as claimed in claim 1,
further comprising a fuel tank disposed to be accessed by said ascent structure when the cover assembly is in said open position.

15. A utility vehicle as claimed in claim 1,
said shifting of the cover assembly away from the ascent structure is in a direction generally transverse to the direction of travel of the vehicle.

16. A utility vehicle as claimed in claim 1,
further comprising a locking mechanism operable to releasably lock said cover assembly in said covering position.

* * * * *